United States Patent [19]

Derrien et al.

[11] 4,090,683
[45] May 23, 1978

[54] HARNESS FOR A MAN CARRYING PARACHUTE INCLUDING A MECHANISM FOR SIMULTANEOUS TAKING THE AIR OUT OF THE CANOPY AND UNFASTENING THE HARNESS

[75] Inventors: Andre Robert Derrien, Ballainvilliers; Celestin Cerati, Longjumeau, both of France

[73] Assignee: Aerazur Constructions Aeronautiques, Issy les Moulineaux, France

[21] Appl. No.: 734,971

[22] Filed: Oct. 22, 1976

[30] Foreign Application Priority Data

Nov. 7, 1975 France ............................ 75 34223
May 31, 1976 France ............................ 76 16405

[51] Int. Cl.² .......................................... B64D 25/06
[52] U.S. Cl. ........................... 244/151 R; 244/151 A
[58] Field of Search ....................... 244/151, 148; 24/205.17, 205.18, 201 LP, 115 R, 116 A

[56] References Cited

U.S. PATENT DOCUMENTS

| | | | |
|---|---|---|---|
| 2,141,041 | 12/1938 | Knight | 244/151 R |
| 2,370,357 | 2/1945 | Kjellson | 244/151 A |
| 2,643,836 | 6/1953 | Carroll | 244/151 R |
| 2,726,832 | 12/1955 | Gimalouski | 244/151 A |
| 3,767,144 | 10/1973 | Gaylord | 24/205.17 |

FOREIGN PATENT DOCUMENTS

| | | | |
|---|---|---|---|
| 688,327 | 6/1964 | Canada | 244/151 R |
| 1,211,338 | 10/1959 | France | 244/151 B |
| 1,130,734 | 2/1957 | France | 244/151 R |
| 64,798 | 11/1968 | Germany | 244/151 B |
| 1,227,946 | 4/1971 | United Kingdom | 244/151 A |

*Primary Examiner*—Galen L. Barefoot
*Attorney, Agent, or Firm*—Cushman, Darby & Cushman

[57] ABSTRACT

The disclosure embraces a harness for a man carrying parachute including at least one mechanism for simultaneous releasing of a riser and of a harness fastening cross-link; the harness includes a means for positioning the connecting points of the riser at the level of the block which hold the harness fastening cross-link, one of the blocks including a lever to which a riser can be connected, the lever being maintained locked by a latch with the latch being maintained in engagement with the lever by a locking rod; the mechanism further includes a bracket which is maintained locked onto a support plate by a rod which holds the harness fastening cross-link so that when the rod is withdrawn, the lever pivots to release the riser and the bracket escapes to release the harness fastening cross-link.

18 Claims, 18 Drawing Figures

HARNESS FOR A MAN CARRYING PARACHUTE INCLUDING A MECHANISM FOR SIMULTANEOUS TAKING THE AIR OUT OF THE CANOPY AND UNFASTENING THE HARNESS

BACKGROUND OF THE INVENTION

1. Field of the Invention

The present invention relates to a harness for a man carrying parachute and more especially to a harness for a parachute including at least one locking means which simultaneously enables the air to be taken out of the canopy and the harness to be unfastened.

2. Description of the Prior Art

A number of harnesses for a man carrying a parachute are presently known wherein the risers for the canopy are attached by so-called releasing devices or releasers positioned at the level of the collar-bones of the parachute wearer. Due to their position, there is a chance for these releasers to hit the face or the head of the parachutist at the time of the opening shock when the canopy opens.

According to other known embodiments of the prior art, the canopy is attached to the harness and, in order to prevent dragging of the parachutist on the earth on landing, the harness is designed so as to be rapidly released from the parachutist. This type of harness presents also defficiencies, especially if, at the time of harness stretching, the air is not taken out of the canopy, the canopy pulls the parachutist's gear and occasionally the additional loads he may carry with him.

OBJECTS OF THE INVENTION

It is an object of the present invention to provide a canopy releasing device which is arranged in such a manner that no shock is produced on the parachutist either at the time of the opening of the canopy when the canopy is being released and which enables simultaneously the air to be taken out of the canopy and the harness to be unfastened.

It is another object of the present invention to provide a locking device which enables the parachutist to fit a parachute onto him and to take it off without having to operate the mechanism for taking the air out of the canopy or the canopy releasing mechanism.

It is another object of the present invention to provide such a locking device as the parts will not separate from each other during operation.

It is another object of the present invention to provide a locking block structure which while providing the two above mentioned functions by means of a single locking element enables the air to be taken out of the canopy and the harness to strech in two stages in order that the air may be taken out of the main canopy and operates the chest parachute without stretching the harness.

SUMMARY OF THE INVENTION

For achieving these objects, the present invention provides a harness for a man carrying parachute including a webbing, known as trapeze webbing, to which the risers of a main canopy can be connected, a cross-link for fastening the harness and means for retaining the cross-link onto the trapeze webbing, and means which enable to position the attaching point of each riser onto the trapeze webbing at the level of the corresponding cross-link retaining means, at least one cross-link retaining means being a locking block including a means which ensures simultaneous releasing of the risers attaching means and the means for attaching the cross-link onto the retaining means.

According to a first embodiment, the means which permits the positioning of each riser attaching point at the level of the retaining means of the harness fastening cross-link includes a positioning means fixed onto the upper portion of the trapeze webbing and a web member integral with the riser and extending to the harness fastening cross-link retaining means.

According to another embodiment, the means which permits to position the attaching point of each riser at the level of the harness fastening cross-link retaining means includes an attaching means at the upper portion of a trapeze webbing, a coupling means positioned at the lower portion of the riser and a web member slidably supported by the coupling means, this web member being attached at one end to the attaching means positioned at the upper part of the trapeze webbing, and at the other end to the harness fastening cross-link retaining means.

According to a further embodiment, the means which permits to position the attaching point of each riser at the level of the harness fastening cross-link retaining means includes a positioning means at one upper end of one of the webs of the harness, a coupling means positioned at the lower portion of the corresponding riser and a web member slidably supported by the coupling means, said web member being attached at one end to the positioned means positioned at the upper end of the harness web and at the other end to the harness fastening cross-link retaining means, said web member being also an element of the trapeze webbing, for connecting the retaining means to the upper portion of the harness web.

Generally speaking, the locking block (s) for the parachute harness includes a support plate, a first means movable between a locked position and an unlocked position, a second means movable between a locked position and an unlocked position and a single locking means effective to maintain both movable means in the locked position.

According to a preferred embodiment, the first movable means includes a movable rod pivotably mounted on the support plate by a pin in order to be pivoted in a plane parallel to the support plate between a first position, or locking position, and a second position, a latch pivotably mounted onto the support plate by a pin in order to pivot in a plane perpendicular to the support plate plane, said latch being positioned relatively to the movable rod so as to retain same in the locked position or to release it, said support plate being eventually further provided with two flanges perpendicular to the plane of the support plate, one hole being formed in each of said flanges, the second movable means being a bracket having a polygonal tubular general configuration and being suitably sized to be inserted between said flanges of the support plate, holes being formed in the sides of the bracket which meet with the holes formed in the support plate flanges once the bracket is positioned between said flanges in such a manner that a clearance is left between the bracket and the support plate, into which clearance one end of the harness fastening cross-link can be retained, the single locking means being a locking pin which, in the lock position, retains the latch closed and fixedly retains the bracket onto the support plate.

In a first modified more preferred embodiment, it is contemplated to connect the risers to the retaining means through a ring, preferably of a rectangular shape, connected to the lower end of the riser and through which is passed a strap connected at one end to a three branch bar ring supported by a web of the harness and at the other end to a pin of the retaining means, for example, to a pivoting arm of a connecting block. Associated with this embodiment, this invention preferably provides a locking block including a rocking lever which can be retained by a locking latch and designed to retain the web member connected to a riser and a rocker pivotably mounted onto the same base plate as the rocking lever, in order to enable locking or releasing one end of the harness fastening cross-link.

According to another embodiment, the retaining means is maintained on the trapeze webbing by two trapeze elements fixed to the upper and lower portions of the trapeze webbing, respectively, and the risers are connected with the retaining means by a web positioned rather similarly to that of the precedent embodiment, the locking block including in this embodiment a support plate, a means movably mounted on this support plate in order to be moved between a locked position and an unlocked position, a movable means locking member and a locking member locking means, the locking means further including a means for retaining one end of the harness fastening cross-link for a locked position of the locking means.

According to a more specific feature, the means for retaining the end of the cross-link is a protrusion carried by the support plate to lock said end of said cross-link when the rod is in locked position and to release it when the rod is in fully unlocked position.

According to another and more specific feature, said rod includes a first means which permits a partial movement of the rod for disengaging the locking means of the movable means and a second means enabling further movements of the rod to disengage said end of the cross-link, said first means which enables a partial movement of the rod being, for instance, a flat formed on said rod in order to enable a first movement of the rod for a determined position of a safety catch mounted on the support plate, and the second means being a second flat formed in a different orientation and permitting a second and further movement of the rod for another position of the safety catch.

Further objects and advantages of the present invention will appear in the following description made in relation with the herewith annexed drawings, on which:

DETAILED DESCRIPTION OF THE DRAWINGS

Figure 1:
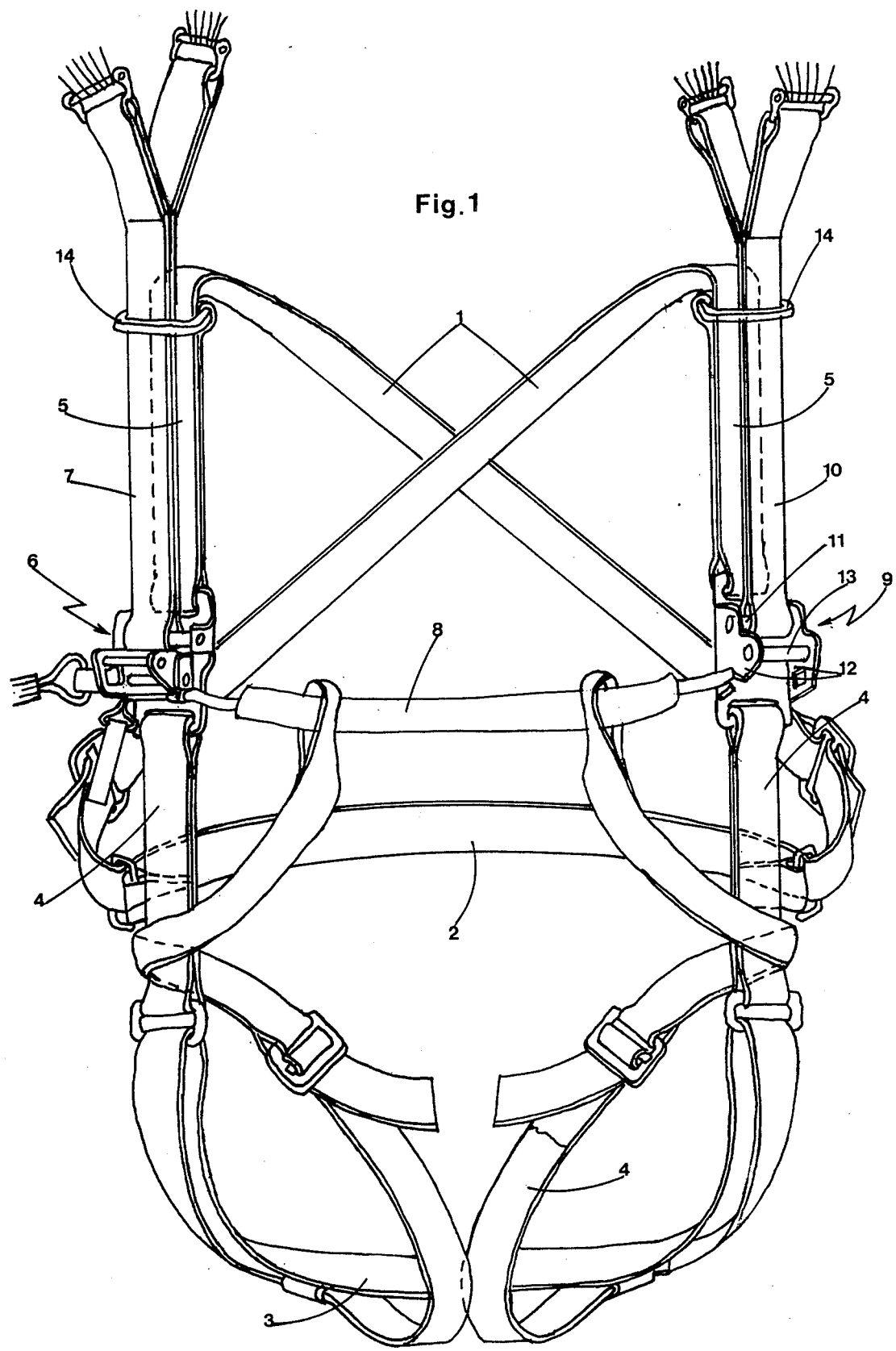
FIG. 1 is a front view of a harness according to the invention.

Referring to FIG. 1, a harness according to the present invention including conventional elements, namely back webs 1, one back cross web 2, one bottom web 3 and thigh webs 4, the assembly bottom web-thigh web and back web being connected to each other by elements of trapeze webbing.

Although the canopy and harness locking device are shown and described here in connection with a harness having simplified adjustment characteristics such as described in the French co-pending patent application No. 75/19554 filed June 23, 1975, under the title: "Harnais de parachutes", it will be understood from the following description that such a device can be installed on any type of existing harness to simultaneously permit taking of the air out of the canopy and stretching of the harness.

As shown in FIG. 1, the assembly bottom web-thigh web is connected to elements 4 of the trapeze webbing while the back webs 1 are connected to elements 5 of the trapeze webbing, the elements 4 and 5 of the trapeze webbing being connected to each other by connecting blocks of retaining means. A right hand connecting block, generally designed by reference 6, includes a mechanism which permits locking of the riser 7 onto a harness fastening cross-link 8 as well as the disengagement at the time of landing, as it will be exposed after. On the left hand side, a linking block, generally designated by reference 9, is a connecting block designated as fixed connecting block, i.e. the corresponding riser 10 is permanently fixed onto a pin 11 which itself is permanently fixed onto the flanges 12 of the connecting block. In addition, the connecting block 9 includes a pin 13 permanently fixed onto the flanges 12 onto which can be fastened one of the snaphooks of the container of the chest parachute or of any part of the parachutist equipment. The flange 12 on the inner side of the harness includes in addition a slot wherein the end of the cross-link 8 and its connecting means can be introduced so that said link can pivot for example around a vertical or biased axis carried by bosses provided on the inner side of the flange 12 (not shown) or of any other known means which permits the cross-link 8 to pivot onto the connecting block 9.

In the embodiment of FIG. 1, the risers 7 and 10 are made in a Y shape from a web which is folded and stitched, the two branches of the Y being connected in a known way to the canopy while the lower end of the Y is connected to blocks 6 and 9, respectively. It will be noted that the blocks 6 and 9, which simultaneously support the risers and the harness fastening cross-link, are in position of utilization at the level of the chest of the parachutist and cannot cause him injuries when the canopy of the harness will open or stretch. Rings or strap loops 14 are fixed onto the elements of the trapeze webbing 5 at the upper end of said elements and provide a correct positioning of the corresponding riser at the level of the collar bone.

Figure 2:
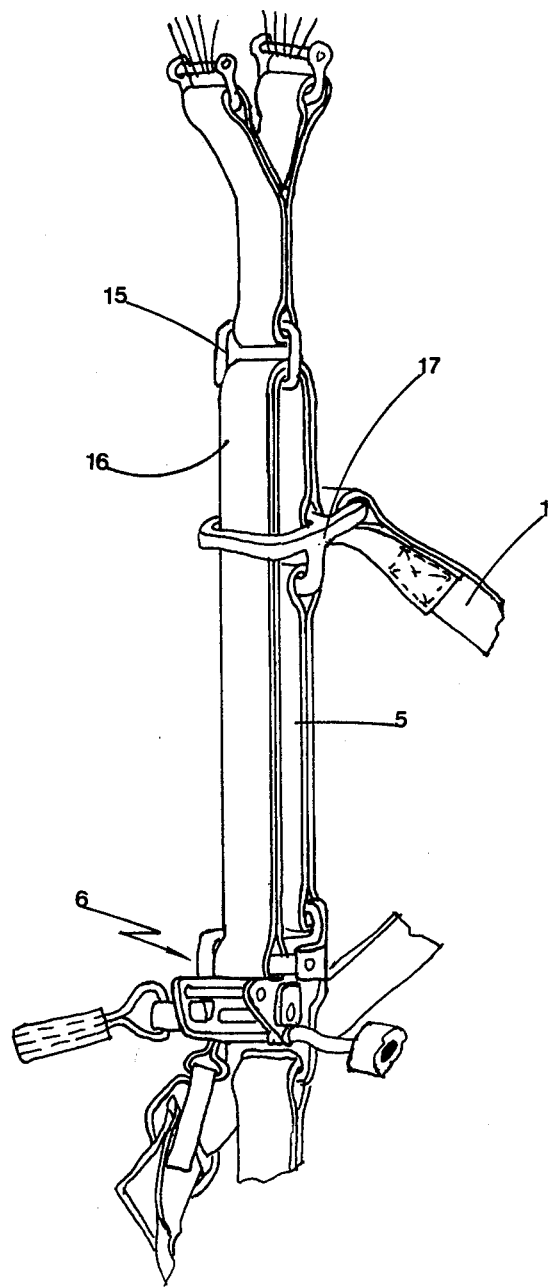
FIG. 2 is a partial perspective view of a first embodiment of the harness according to the present invention.

In the embodiment shown on FIG. 2, the harness structure is substantially similar to that described in relation with FIG. 1, and particularly includes the same connecting blocks, the structure of which will be described more specifically below. However, in this embodiment, the Y shaped risers have a short lower portion, the connection of which is positioned at the level of the connecting blocks by means of a device including a ring 15, preferably of a rectangular shape, attached at the lower portion of the corresponding riser and into which a web 16 is passed, connected at one end to a three branch ring 17, said ring being connected both to the element 5 of the trapeze webbing and to the back web 1. The web 16, after its passage in the ring 15 passes behind the external branch of the ring 17 to provide a correct positioning at the level of the collar bones and it is connected to the corresponding pin of a connecting block in a similar way to the lower portion of the risers of FIG. 1. Therefore, in the embodiment of FIG. 1, as well as in that of FIG. 2, it will be noted that the effort exerted by the canopy is transmitted at the level of the connecting blocks. Once the connecting block 6 is open, the corresponding shroud lines of the parachute are released and the air is taken out of the parachute while when the harness opens, as it will now be explained.

Figure 3:
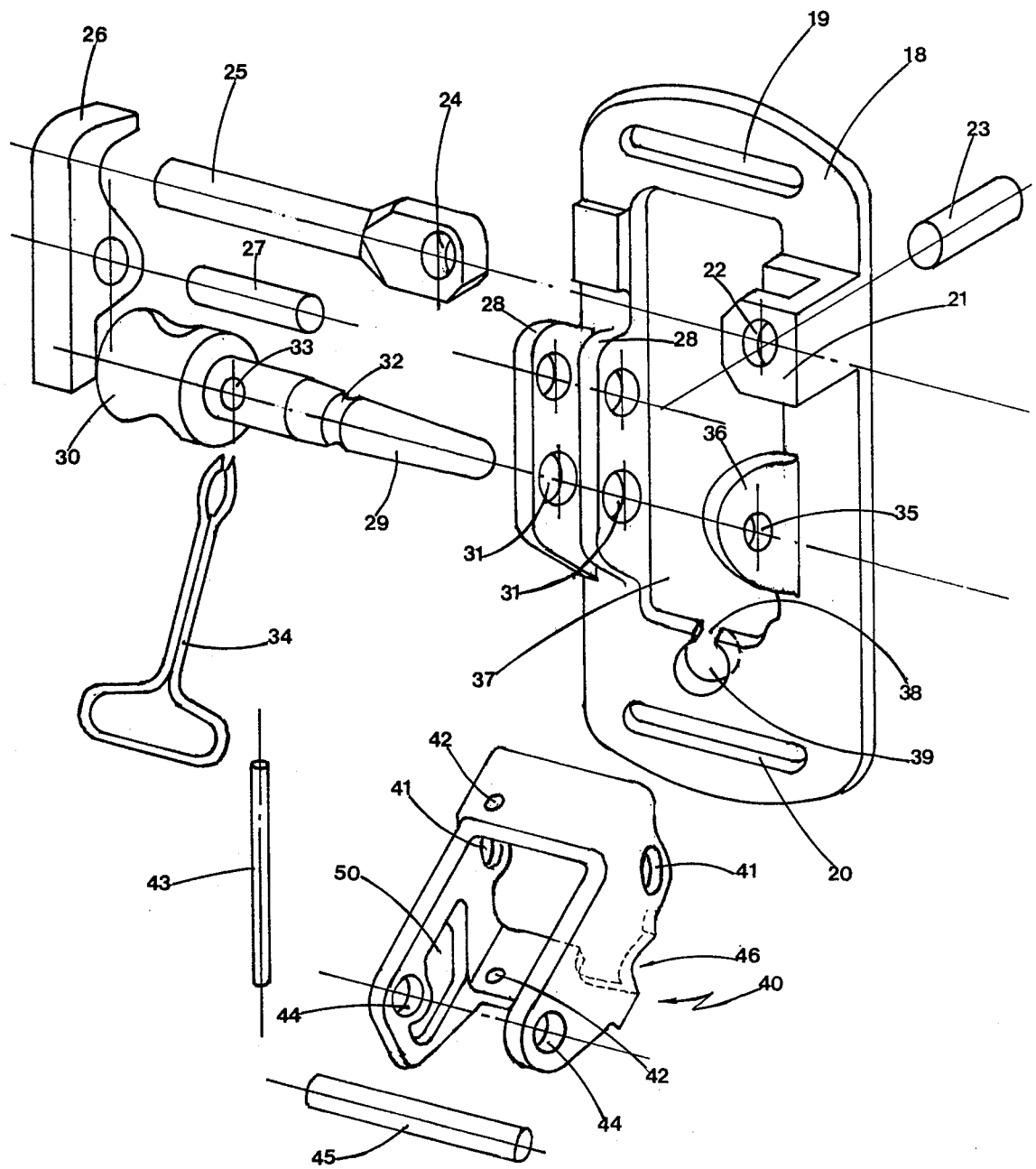
FIG. 3 is an exploded perspective view at an enlarged scale of a first locking block according to the invention.

In FIG. 3 there is a perspective exploded view at an enlarged scale of a locking block 6 including a mechanism which permits a simultaneous releasing of a riser and of the harness fastening cross-link. The connecting block includes a support plate 18 having long slots 19 and 20 formed into its ends for attaching the block to the elements of the trapeze webbing. One support element 21 is formed on the block including a bore 22 into which a pin 23 can be received for cooperating with a bore 24 formed into the end of a pivoting rod having a smooth shaft with a drilled head 25 in order to mount this pivoting rod 25 onto the support plate 18, said rod 25 being pivotable in a plane parallel to the support plate 18. A latch 26 is provided to retain the free end of the rod 25. The latch 26 is supported on the support plate 18 by a pin 27 located into bores formed into the spaced apart flanges 28 and extending perpendicularly to the plate 18, the latch 26 being positioned between the flanges 28 and being pivotably mounted on the pin 27. A locking pin 29 including a head 30 is provided to be introduced into the bores 31 formed into the flanges 28 under the pin 27. A groove 32, the purpose of which will be described below, and a bore 33, perpendicular to the rod axis, into which a locking pin 34 can be received, are formed into the rod 29. The end of the rod 29 away from the head 30 is preferably slightly tapered to facilitate its insertion into the various bores. The end of the rod 29 away from the head 30 is supported in the locked position by a bore 35 formed into a flange 36 formed on the support plate 18, spaced apart from the flanges 28, the bore 35 being in line with the bores 31.

The support plate 18 includes a central opening 37, the lower edge 7 which being intersected by a cut 38 providing a restricting passage between the opening 37 and the opening 39 of a substantially circular shape, the purpose of which will be described below.

Finally, the mechanism includes a chest parachute container support member or bracket, generally designated by reference 40, having the shape of a polygonal tubular sleeve, the section of the bracket shown here being substantially square. The width of the bracket is such as said bracket can be inserted between the ear 36 and the flange 28 which is adjacent to the inner edge of the central opening 37. At one end of the vertical sides of said bracket are formed bores 41, the size of which being adapted to receive the rod 29 when the bracket 40 is installed onto the support plate. Bores 42 are also provided in the horizontal sides of the bracket 40 to receive one resilient pin or blade 43, for example a section of piano wire, the bores 42 being formed at such a distance from the bores 41 as when the bores 41 are in line ways with the bores 31 and 35 and when the rod 29 is installed in place, the spring 43 cooperates with the groove 32 of the rod 29 to provide a snappy action on the rod 29. At the opposite end of the bores 41, drillings 44 are formed into the vertical sides of the bracket 40 to receive a pin or rod 45 onto which the snap-hook of the container of the chest parachute can be fastened, and a cut 50 is formed to permit connection of any auxiliary equipment carried by the parachutist. A cut 46, the purpose of which will be discussed hereafter, is formed in the side of the bracket 40 which is close to the ear 36 when the bracket is installed in place.

Figure 4:
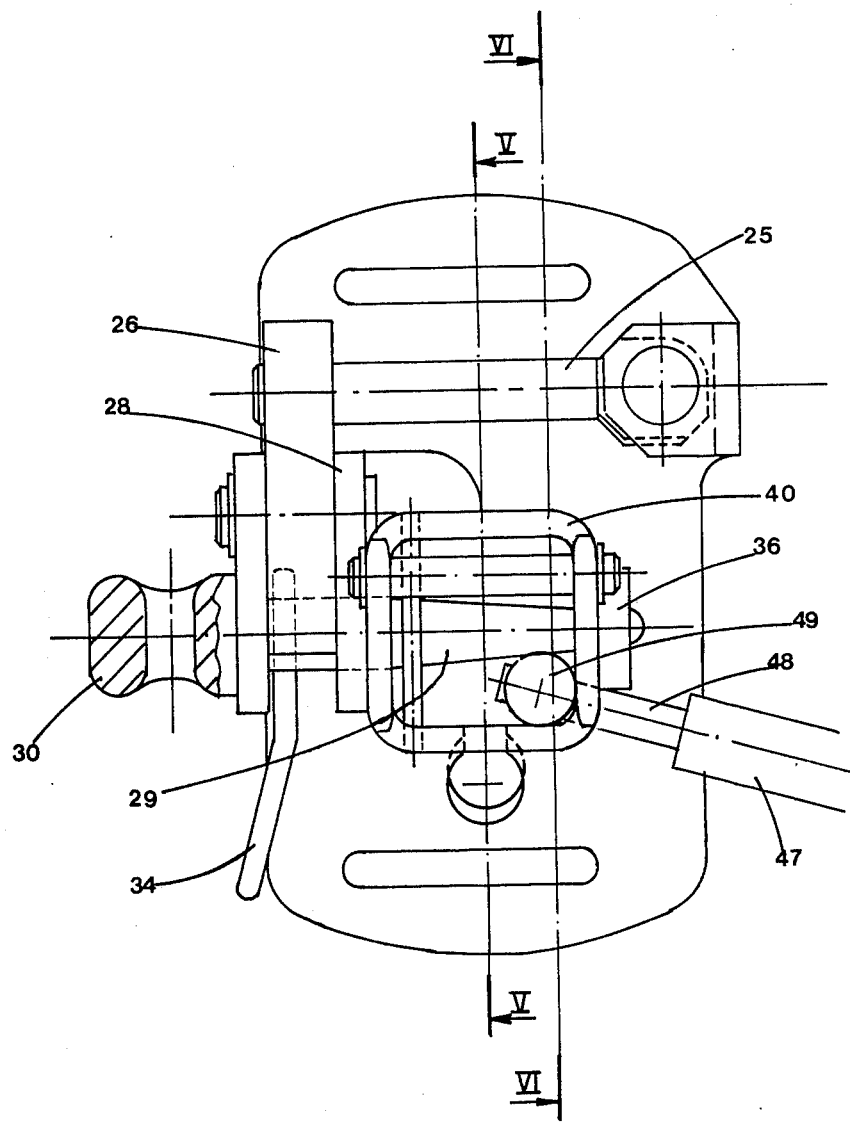
FIG. 4 is a front view of the locking block in the locked position.
Figure 5:
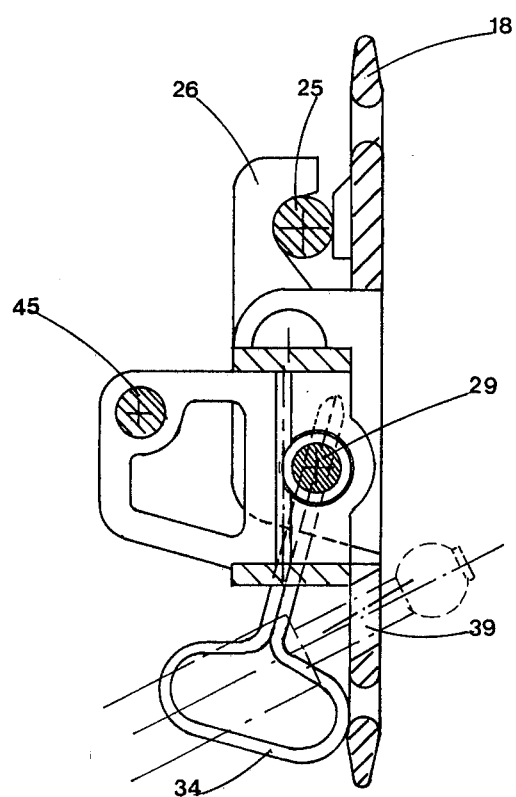
FIG. 5 is a section view along the line V—V of FIG. 4.
Figure 6:
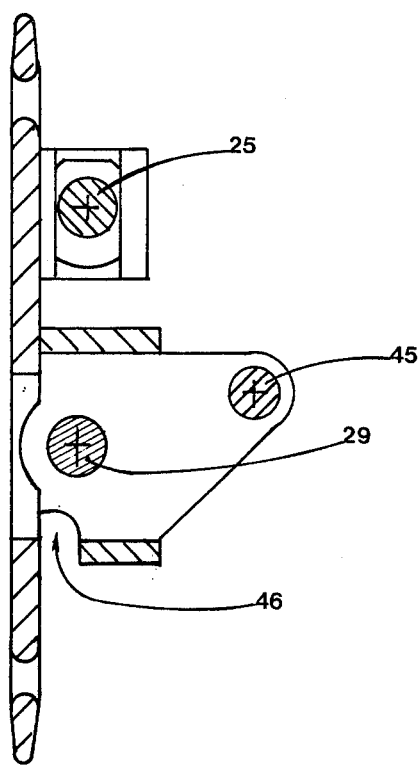
FIG. 6 is a section view along line VI—VI of FIG. 4.

Referring now to FIGS. 4 to 6, the position of various parts when the mechanism is locked onto the harness can be seen. The lever 25, around which is passed the end of a riser, is maintained in horizontal position by the latch 26 which itself is maintained against the plate 18 by the locking rod 21. Said rod is itself maintained in place by the resilient pin 43 cooperating with the groove 32 and by the safety pin 34 engaged into the bore 33. It will be noted (FIG. 5) that the bore 33 is positioned at a certain orientation to prevent the access of said pin 34 into this bore not to be affected by the heel of the latch 26.

Prior to the insertion of the locking rod 29, the bracket 40 must be inserted between the ear 36 and the flange 28 which is adjacent to the edge of the inner passage 37 so that the bracket 30 is also locked to the plate 18 by the rod 29. The main canopy and the chest parachute are thus retained with the harness.

As far as the harness fastening cross-link is concerned, it is shown here under the form of a flexible link described particularly in the French co-pending application No. 75/21763 filed on July 10, 1975 under the title: "Depositif de fermeture par barrette souple pour harnais de parachute à personnel". This flexible cross-link includes a flexible cable 47 eventually surrounded by a jacket, its end portions including ends comprising a rod 48 and a head 49, for example of a substantially spherical shape. The size of the rod 48 and the head 49 are such as, when the bracket 40 is installed on the plate 18, the rod 48 can slide freely in the clearance provided between the bracket 40 and the plate 18 by the cut 46, but the head cannot pass through this clearance.

For fastening the harness, the cable 47 is bent to engage the head 49 and the rod 48 into the bias opening 39 of the plate 18 (position shown at FIG. 5). Then, the end of the cross-link is moved upwards, the head 49 then passes through the opening 37 while the rod 48 passes through the cut 38 (FIG. 3) and the link is then released, taking the position shown at FIG. 4, i.e. wherein the link 48 is substantially parallel to the support plate 18 in the clearance provided between the plate 18 and the bracket 40 by a cut 46. If the parachutist wants to remove all his gear before the jump, he can do so by carrying out in reverse order the operation which has just been described. It can be noted then that it is not necessary to operate the riser releasing mechanism to fit the gear on the parachutist or remove same. However, the removal of the gear cannot be done inadvertently since to carry out such a removal the following operations must be carried out: bringing the head 49 back above the cut 38, twisting the cable 47 to bring the rod 48 of the end of the link in line with the cut 38 to move the end downwards and pulling towards the front to extract the head 49 out of the opening 39. It will be also noted that, instead of a cut 46 into the bracket 40 a sufficient distance can be provided between the lower edge of the bracket and the axis of the bores 41, so that a clearance is obtained between the support plate 18 and the lower edge of the bracket when said bracket is installed. The clearance must be sufficient to enable a movement of the rod 48 of the cross-link head without making the head 49 escape.

Figures 7, 8:
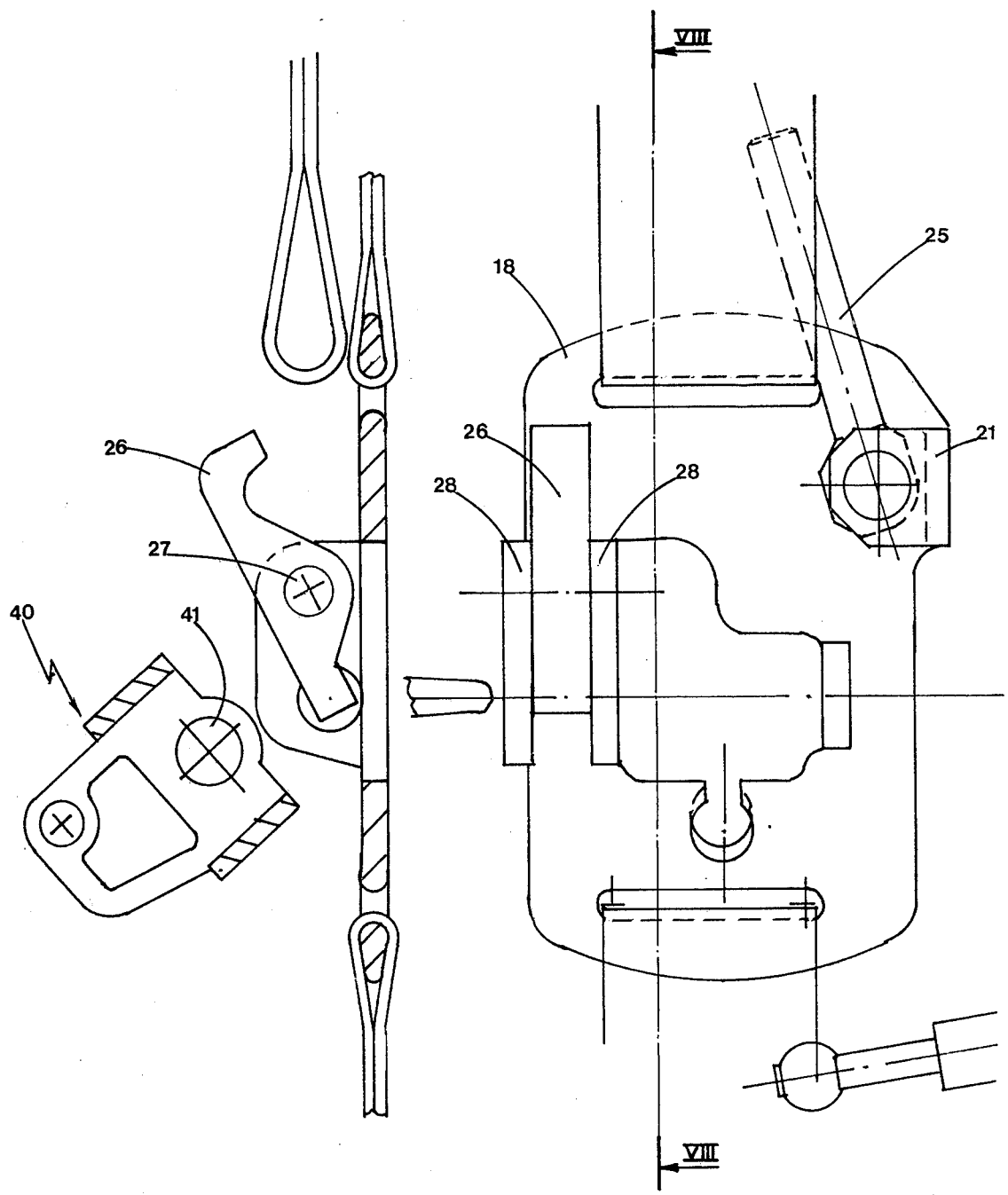
FIG. 7 is a front view similar to that of FIG. 4, the mechanism being then in the open position.
FIG. 8 is a section view along the line VIII—VIII of FIG. 7.

In FIGS. 7 and 8, it is shown the position of various parts of the mechanism once the parachutist has landed, i.e. after the rod 29 has been withdrawn. After having withdrawn the safety pin 34, the parachutist can pull on the rod 21. The heel of the latch 26 is no longer retained away from the plate 18 and this latch pivots on the pin 27, thus releasing the rod 25 which pivots around the pin 23 and disengages the riser 7 or the web 16. Simultaneously with the disengagement of the riser, the bracket 40, which is no longer retained, falls together with the chest parachute container and releases the head 49 of the flexible cross link 8 thus permitting the harness to be unfastened.

It will be noted that the device described above could be used with any type of cross-link. In case a rigid cross-link comprising a ring at its end would be used, the bracket 40 could be substituted by a drilled pin attached to the support plate 18 and extending perpendicularly thereto, the ring of the cross-link being thus installed in place prior to the insertion of the rod into the drilling of the pin. Also, instead of having the rod inserted underneath the heel of the latch 26, the pin which rotably supports the latch 26 can be positioned lower than the bores into which the rod is introduced, said rod being thus installed over the latch to prevent it from pivoting.

On another hand, the blocks 6 and 9 have been described not only for locking the risers and the harness fastening cross-link but also as connectors between the elements 4 and 5 of the trapeze webbing; it should be noted that the trapeze elements 4 and 5 could be made in one piece, the locking blocks being then attached onto each trapeze webbing element for example by eyelets to provide a means for retaining the risers and the cross-link.

Figure 9:
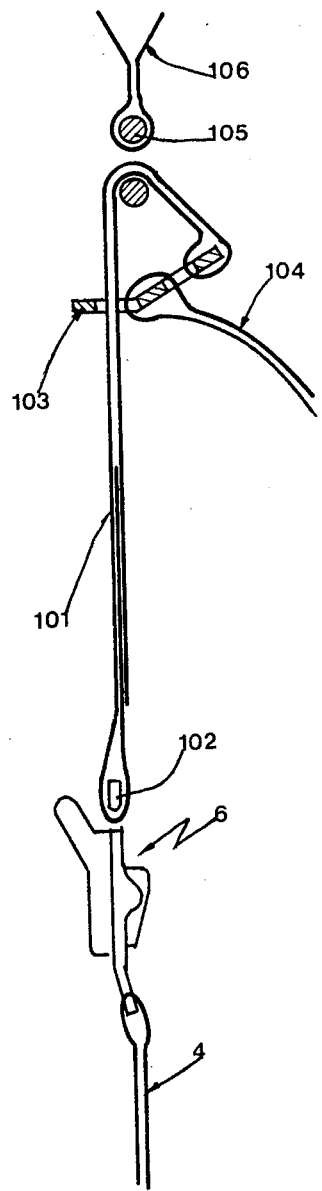
FIG. 9 is a side view showing in a schematic form a portion of a second embodiment of a harness according to the present invention.

Turning to FIG. 9, another embodiment is shown into which the harness of the present invention comprises a locking block, still generally designated by reference 6, retained at its lower portion by an element 4 of the trapeze webbing and at its upper portion by a strap 101 which acts as an upper element of the trapeze webbing and comprises at one of its ends a loop positioned around a pivoting lever 102 of the locking block 6. The other end of the strap 101 is attached to a three bar ring 103 including an intermediate fixed bar around which a belt 104 of the harness is attached. The strap 101 further passes through a ring 105 attached at the lower portion of a riser 106 of the parachute canopy. On FIG. 9, the strap 101 is shown as made from a web of textile material folded in order to provides loops at its ends. It should be understood that the strap 101 can be made in any manner providing a loop at each of its ends. Starting from its attaching point onto the ring 103, the strap 101 passes successively into the ring 105, and then in an opening of the ring 103 so that when the end which is retained around the pivoting level 102 is disengaged, the strap 101 is disengaged and releases the riser 106 in order to enable the air to be taken out of the main canopy. It should be noticed that this structure is generally similar to the structure which has been described in relation with FIG. 2, the element 5 of the trapeze webbing being in this instance eliminated. Especially the harness can include a locking block 6 on one side and a fixed retaining means on the other side of the type of the means designated by reference 9 on FIG. 1.

Associated with the arrangement just described, in a preferred embodiment, a locking block such as shown on FIGS. 10 to 13 is used. The locking block includes a U-shaped plate 107 comprising at its lower end a slot 108 for connecting the support 107 to the lower end of the trapeze webbing. At the upper portion of one of the legs of the support plate 107, said support plate comprises a first U-shaped clevis 109 formed with bores 110, a pin (not shown) extending into these bores and in that formed in the head of the pivoting lever 102 in order to pivotably support the lever 102.

At the end of the other leg of the support plate, said support plate comprises a second U-shaped clevis 111, a locking latch 112 being received between the two branches of the clevis 111 and being supported onto same by a pin 113. A groove 114 is formed in the pin 113 for retaining same through a pin 115 inserted into a bore 116 formed in one of the branches of the clevis 111. At the upper end of the forward branch of the clevis 111 is formed a boss 117 into which is formed a cavity facing the inside of the support plate 107 into which the end of a rod 118 can be received; the end of the rod 118 which is located into the cavity has a spherical configuration thus pivotably supporting the rod 118, the ball end 119 being retained into the cavity of the boss by a pin 120. The container of the chest parachute is attached to the rod 118 when the locking block is in closed position and the rod 118 normally extends between the boss 177 and the upper end of a rocker 122 which will be described below.

In the branch of the support plate 107 which carries the clevis 109 is formed a bore 120 into which a pin 121 can be positioned in order to permit the rocker, generally designated by the reference 122 to be introduced. The rocker 122 itself is provided with a horizontal U-shaped clevis 123, the ears of which being positioned on either side of the support plate 107 and being provided with bores 124 into which the pin 121 is extending. The pin 121 is formed with a groove 125 to retain the pin 121 onto one of the ears of the clevis 123 by a pin 126 driven into a bore 127 formed into one of the ears of the clevis 123; perpendicular to the axis of the bores 124. A heel 128 is formed at the lower end of the rocker 122, the purpose of which will be discussed below in relation with the operation of a locking block; at the upper end of the rocker 122 is formed a bore 129, the axis of which being perpendicular to the axis of the bores 124 and adapted to receive the end of the rod 18 when the locking block is in closed position.

A boss 130 is formed on the support plate 107, said boss being provided with a bore 131 extending in a direction parallel to the plane of the support plate 107 and adapted to receive a rod 132 the outside end of which being formed with an opening 133 into which a strap element 154 is passed in order to facilitate pulling of the rod. Adjacent to the opening 133, the rod has a cylindrical portion 134 onto which the heel 135 of the latch 122 can rest when the locking block is in closed position (see FIG. 11). A notch 136 is also formed in the rod, the heel 135 of the latch 112 engaging into this notch when the locking block is opened; a shoulder 137 is also formed on the rod (see FIG. 12) cooperating with a catch 138 mounted on the side of the boss in order to provide a safety retention of the rod in the closed position of the locking block. For this purpose, the catch 138 is pivotably supported on the external side of the boss 130 by a shoulder screw 139 extending through a bore 140 of the catch. Two bores 141 and 142 are formed into the catch and a section of rope 153 is passed in the bore 141 in order to actuate the catch and a positioning pin 143 urged against the catch by a leaf spring 144, said leaf spring being fixed by the shoulder screw 139. The position pin 143 extends in the bore 142 and cooperates with a blind hole of shallow depth (not shown) in the external surface of the boss 130 in order to act as a detent to prevent the catch from pivoting. The rod 132 is retained by a teat-screw with a dock point 145 which is screwed in the rear face of the support plate 107 and which extends radially into the bore 131 to cooperate with a groove (not shown) formed on the rear face of the rod on a portion of the length of said rod. Said rod includes also a flat portion 146 (see FIG. 13) so that the rod may slide when the catch 138 has been downwardly pivoted.

On an other hand, the support plate 107 is formed with a bent bar portion 147 forming with the boss 117 and the support plate a rigid ring to which extra loads can be connected. An ear 148 is integral with one of the legs of the support plate 107 and extends to said support plate, above the center portion of the U to provide with a portion 149 cut into the base of the U of the support plate 107, a passage for the insertion of the end of a flexible cross-link so that said end of said link can slide in a plane parallel to the plane of the support plate 107, such as described here before in relation with FIG. 4. In this instance, the disengagement of the cross-link will not follow the disengagement of a bracket as in the embodiment described above, but the end of the cross-link will escape along the inclined edge of the ear 148, as will be explained below with the operation of the whole device.

Figure 11:
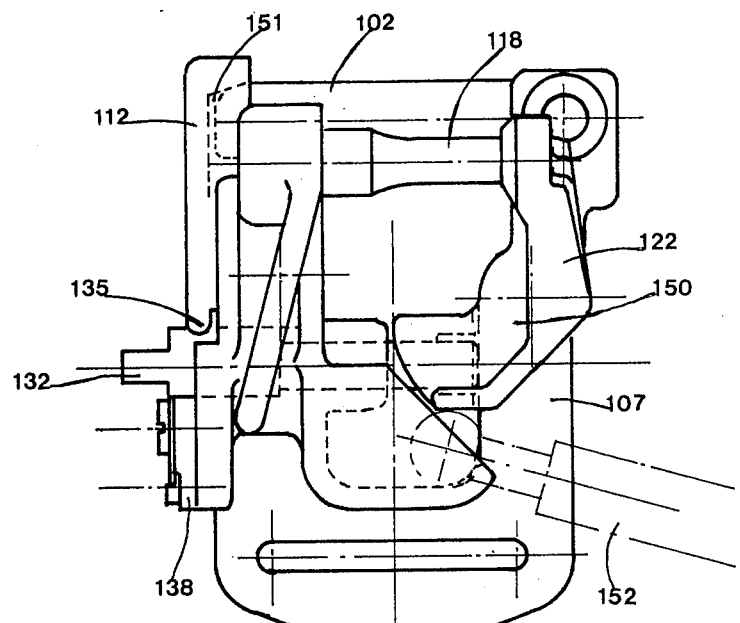
FIG. 11 is a front view of the block of FIG. 10 in closed position.
Figure 16:
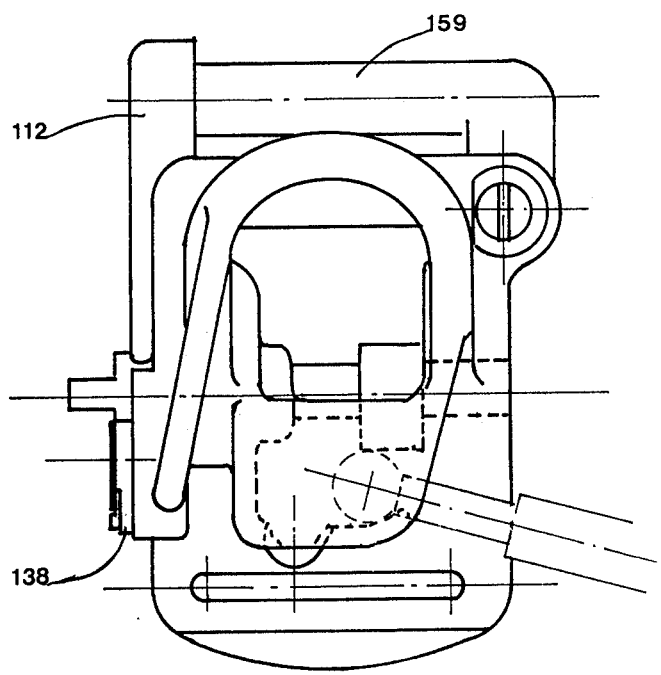
FIG. 16 is a front view of the locking block of FIG. 15 shown in locked position.

The FIG. 11 shows a front view of the locking block in closed position. In this position, the rod 132 is extending into the bore 131 of the boss 130 and is retained in this position by the catch 138 which is in its upwards position, thus cooperating with the shoulder 137. The end of the rod 132 opposite to that provided with the passage 133 bears then on the upper face of the lower wall of a recess 150 of the rocker 122 and thus retains said rocker in a substantially vertical position. The pivoting lever 118 is thus retained in the hole 129 of the rocker and retains the snap-hook of the container of the chest parachute. In addition, the heel 135 of the latch 112 is maintained upwards by the cylindrical portion 134 of the rod 132 and thus the latch is locked in a vertical position where it cooperates with the end of the pivoting rod 102 inserted in a cavity 151 of the latch 112. Finally, the end of the cross-link is maintained by the lower face of the heel 128 of the rocker 122, the upper edge of the base of the U 107 and an edge bent internally of the 148 (shownred in dotted lines in FIG. 11).

Figures 12, 13:
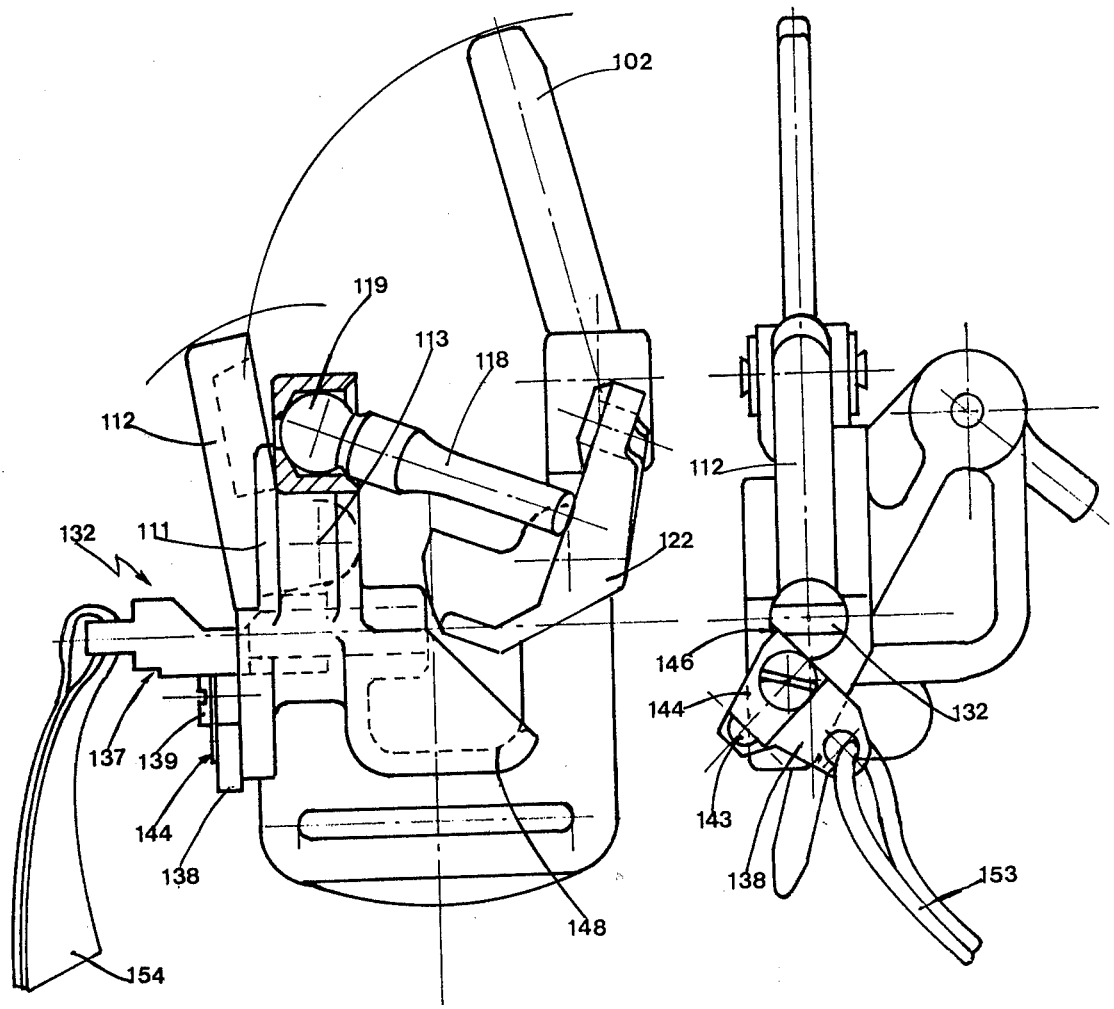
FIG. 12 is a front view of the locking block of FIG. 10 in open position.
FIG. 13 is a side view of the block of FIG. 12.
Figure 15:
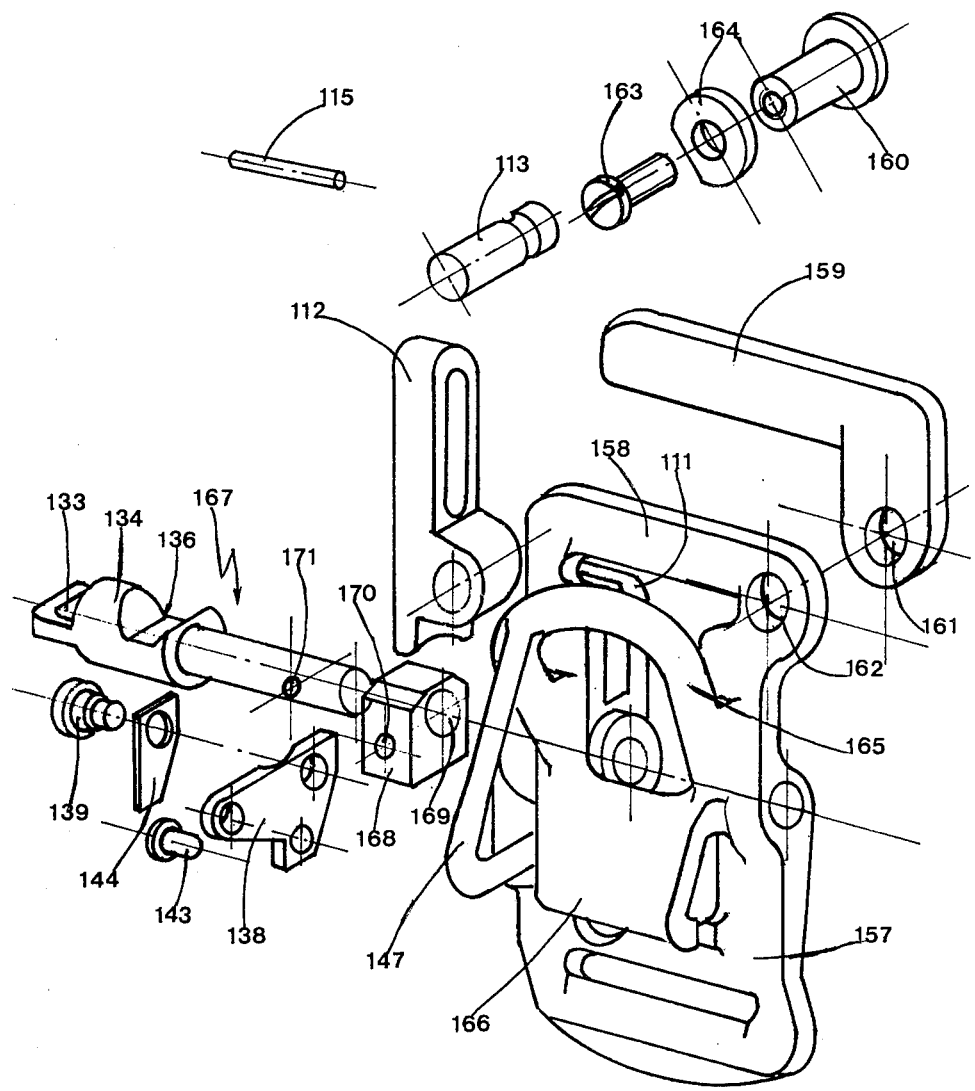
FIG. 15 is a perspective exploded view of another preferred embodiment of a locking block associated to the harness of FIG. 14.

When the parachutist is landing, he pulls the rope element 153 downwards, to pivot the catch is shown in FIG. 13, thus releasing the rod 132 which in turn may be pulled by activating the strap element 154. The heel 135 of the latch 112 engages then in the notch 136 of the rod 132 and disengages from the end of the pivoting level 102 which, when pulling the strap 101, pivots about its supporting pin and releases the strap 101 and thus, the riser 106 causing thereby the air to be taken out of the canopy. Simultaneously, the rocker 122 is released and pivots about its supporting pin and takes the position shown in FIG. 12 under the action of the end of the harness fastening cross link. The end of the cross-link 152 can thus escape through the opening defined by the inclined edge of the ear 148 and the end of the rod 118 is also released permitting thus to this rod to disengage from the snap-hook of the container of the chest parachute.

Figure 14:
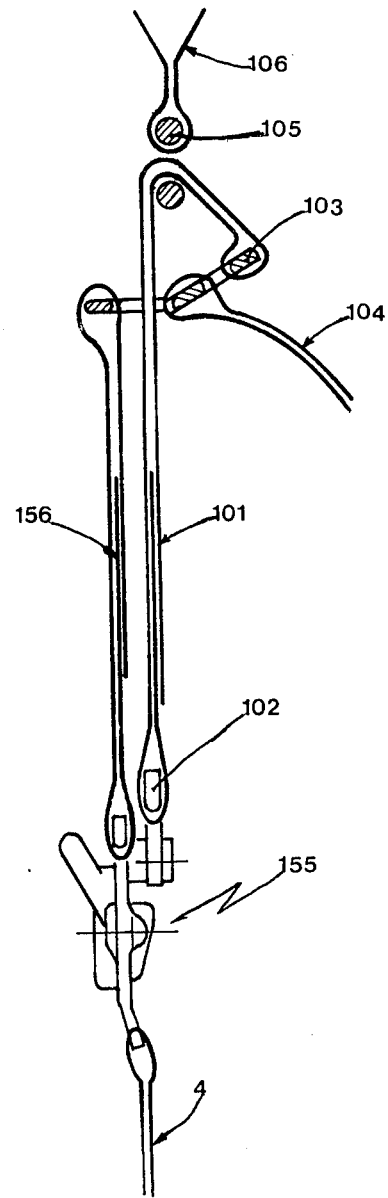
FIG. 14 is a side schematic view of a third embodiment of a harness according to the present invention.
Figure 10:
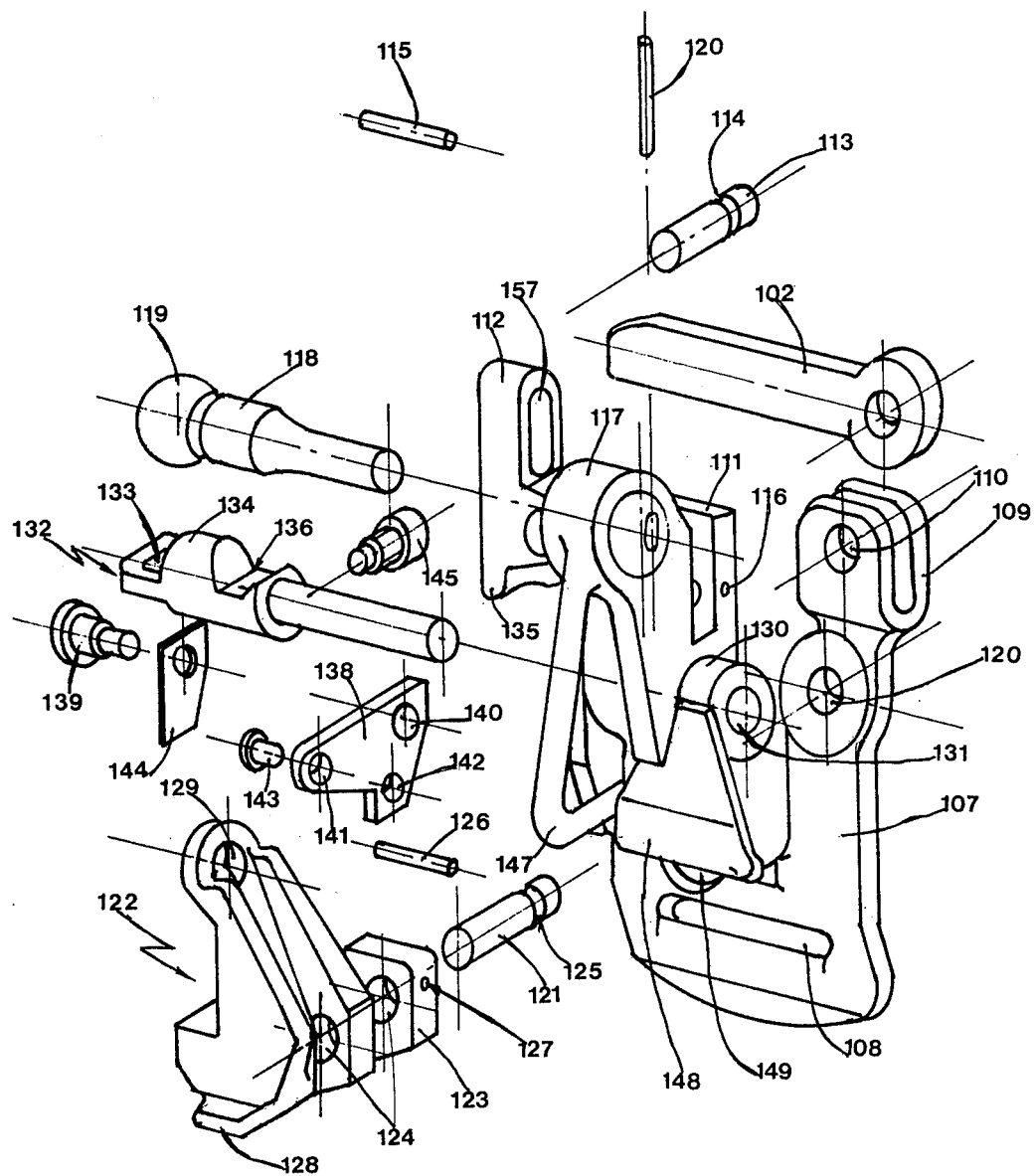
FIG. 10 is a perspective exploded view of an embodiment of the locking block of the invention.

FIG. 14 schematically shows another embodiment of a harness equipped with a locking block permitting both to take the air out of the canopy and to open or stretch the harness by means of a single rod, both operations being however obtained in two steps, in order to enable to take the air out of the main canopy and to use the central canopy without opening or stretching the harness. As in the embodiment described here before, the harness includes a back web 104 connected with the intermediate bar of a ring 103, said ring further supporting a strap 101 passing through a ring 105 attached to the lower end of a riser 106, the strap 101 being further passing around a pivoting level 102 of a locking block generally designated by the reference 155. In this embodiment is further provided a web 156, one end of which being attached to the base plate of the locking block 155 and the other end being attached to one of the bars of the ring 103, the web 156 being thus an element of the trapeze webbing extending to the front of the strap 101. The connection of the canopy to the harness of the parachutist is therefore substantially similar to that described in relation with FIG. 2, with the exception that in the embodiment of FIG. 2, the element 5 of the trapeze webbing is positioned at the rear of the web portion 16 extending down to the locking block, while in the present embodiment, the element 156 of the trapeze webbing is positioned to the front of the strap 101.

The FIGS. 15 to 18 show a locking block structure especially adapted for use with the harness structure described in relation with FIG. 14. In this embodiment, the locking block comprises a support plate 157 of a substantially rectangular shape and having a central opening formed therein, the upper portion of this opening defining with the upper end of the support plate a supporting zone 158 for connection with the web 156 (not shown). The support plate 157 has a clevis formed therein, similar to that of the embodiment shown on FIG. 10, to receive a pin 113 supporting a pivoting latch 112, said pin retained by a pin 115, in a similar way to that described before for the other embodiments. The pivoting lever 102 is replaced in this modified embodiment by an L shaped pivoting lever 159 supported onto the support plate by a headed pin 160 passing through bores 161 and 162 in the lever 159 and in the support plate, respectively and retained by a screw 163 spaced from the support plate by a washer 164. It should be noted, however, that the pivoting lever 159 could have a shape similar to that of the pivoting lever 102 and be supported on the support plate 157 by a clevis identical to the clevis 109 described in relation with FIG. 10.

In the present embodiment, the pivoting lever 118 is replaced by a fixed bridge portion 165 integral with the support plate 157 and to which the snap-hook of the chest parachute can be connected. In addition, the support plate is formed with a rigid ring 147 identical to that described in relation with FIG. 2 and on ear 166 extending substantially parallel with the plane of the support plate 157, above the lower portion of the central opening of the support plate to enable engagement and disengagement of the end of the cross-link as will be explained below with the description of operation.

The device further includes a rod 167 having, as rod 132, a cylindrical shank 134, a notch 136, a grasping ring 133 and a shoulder 137 with which a catch 138 can cooperate, this catch being supported by a screw 139 and including a positioning pin 143 resiliently urged against the side of support plate 157 by a leaf spring 144 fixed by a screw 139. The rod also supports a block 169 into which is formed a bore 169 through which the shank of the rod 167 is extended, the block and the rod being connected by a pin (not shown) extending in bores 170 and 171 in the block and the rod, respectively. Of course, the block can be retained onto the rod by any other suitable means.

Figures 17, 18:
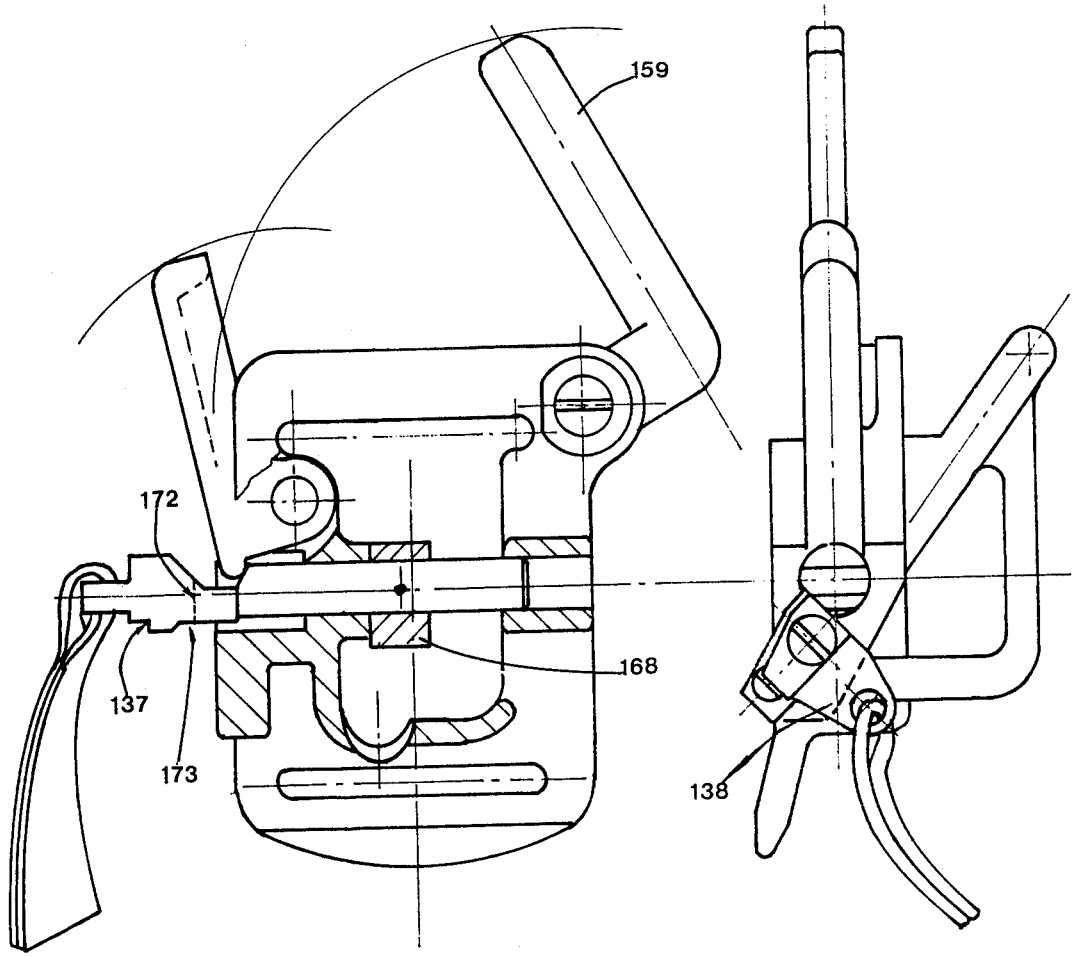
FIG. 17 is a front view, partially cut out, of the locking block of the FIG. 15 shown in open position.
FIG. 18 is a side view of the locking block of FIG. 17.

A flat, identical to flat 146 shown in FIG. 13, extends on a part of the length of the rod head to a distance from the end shown by the dotted line 172 on FIG. 17. The rod is formed also with a flat 173 on its lower end, the purpose of which will be explained here after.

Referring to FIG. 6 which shows the device in closed position, it can be seen that when the rod is fully driven in position and retained by the catch 138, the latch 112 is maintained vertical and holds the lever 159, thus preventing the air to be taken out of the canopy. On another hand, the supporting block 168 is fixed on to the rod, at such a point that, for this position of the rod, the supporting block 168 is located substantially at the right hand side (as seen on FIG. 16) of the central opening of the support plate and thus cooperates with the end of the flexible crosslink to prevent it from escaping. The harness is thus maintained fastened by the parachutist.

When taking the air out of the canopy, the parachutist pulls the catch 138 down, as indicated in relation with the first embodiment, and pulls the rod out, until the end of the flat portion 146 hits the upper edge of the catch 138. In this position of the rod, the heel 135 of the latch 112 can drop into the notch 136 and under the pulling of the strap 101, the lever 159 pivots and, permits taking the air out of the canopy. The arrangement is such as, for this position of the rod, the movement of the supporting block 168 is unsufficient to release the end of the flexible cross-link. In this position the chest parachute remains thus attached to the bridge portion 165 and the harness remains fastened on to the parachutist. He can thus use the emergency parachute after having taken the air out of the main parachute. For being fully released the parachutist must then separate the chest parachute from the bridge portion 165 and pull the rod 167 to release the end of the cross-link and enable the harness to stretch. In order that the rod be sufficiently pulled to release the end of the flexible cross-link, the parachutist must then bring the catch in its first position, the catch being this time in front of the flat position 173, permitting thereby the rod to be pulled until the supporting block 168 hits against the loss, as indicated in FIG. 17. In this position of the supporting block 168, the end of the cross link is released and the harness can then be unfastened. It should be noted that, in this embodiment, it is not necessary to use a setscrew with a dog point similar to screw 145 since the supporting block prevents the rod from being dropped.

Although the connecting blocks 6 and 9 have been described above as two distinct blocks of which one is stationary and the other includes a movable mechanism, it will be apparent that both blocks could be similar, namely they could both comprise a mechanism similar to those described in relation with the blocks 6. After the parachutist has landed, he might then simultaneously release both risers. A single block with a mechanism as described is sufficient however since, as soon as one of the risers is released, the air is readily taken out of the canopy and the harness is stretched.

The present invention is not limited to the embodiments above described, but is in the contrary susceptible of variants and modifications that will appear to those skilled in the art.

What is claimed is:

1. A harness for a man carrying parachute comprising a trapeze webbing, means for attaching risers to said trapeze webbing to shroud-lines of a main canopy, a harness fastening cross-link having two opposite ends and provided for fastening the harness onto a parachutist at the level of his chest, means for connecting said ends of said cross-link to said trapeze webbing, and a means for positioning the attaching point of each said riser onto said trapeze webbing at the level of the corresponding connecting means for connecting said cross-link to said trapeze webbing, wherein at least one of said connecting means for connecting said cross-link to said trapeze webbing is a locking block including a means for ensuring a successive release of the corresponding said riser attaching means and of the corresponding said cross-link connecting means.

2. A harness for a parachute according to claim 1, wherein said means for positioning the connecting point of each riser at the level of the harness cross-link connecting means includes a locating means fixed at the upper portion of the trapeze webbing and a strap element integral with the riser and forming an extension thereof up to the harness fastening cross-link.

3. A harness for a parachute according to claim 1, wherein said means to position the connecting point of each riser at the level of the harness fastening cross-link includes a further connecting means at the upper portion of the trapeze webbing, a linking means placed at the lower portion of the corresponding riser and a strap element which can slide in the linking means, said strap element being attached at one end to said further connecting means placed at the upper portion of the trapeze webbing and at the other end to the connecting means of the harness fastening cross-link.

4. A harness for a parachute according to claim 1, wherein said means for positioning the connecting point of each riser at the level of the connecting means for the harness fastening cross-link includes a locating means at the upper portion of one of the harness webs, one linking means placed at the lower portion of the corresponding riser and a strap element sliding in the linking means, said strap element being attached at one end at the locating means positioned at the upper end of the harness belt and at the other end of the connecting means of the harness fastening cross-link, said strap element acting also as an element of the trapeze webbing for a connection of said connecting means to the upper portion of the harness belt.

5. A locking block for a parachute harness comprising a trapeze webbing, means for attaching risers to said trapeze webbing, a harness fastening cross-link having two opposite ends and provided for fastening said harness onto a parachutist at the level of his chest, means for connecting said ends of said cross-link to said trapeze webbing, wherein said locking block serves both as one of said means for attaching one of said risers to said trapeze webbing and as said means for connecting one corresponding end of said cross-link to said trapeze webbing, said locking block comprising a support plate, a first means movable between a locked position and an unlocked position, a second means movable between a locked position and an unlocked position, and a single locking means for maintaining both said movable means in locked position, said support plate being formed with two flanges perpendicular to the plane of said support plate, a bore being formed in each flange, said second movable means being a bracket of a general polygonal tubular configuration having side portions and suitably sized to be inserted between said flanges of said support plate, said side portions of said bracket being formed with bores which come in alignment with said bores of said flanges when said bracket is installed in position between said flanges of said support plate, whereby said bracket defines with said support plate a clearance into which said one end of said harness fastening cross-link can be retained.

6. A locking block for a parachute harness comprising a trapeze webbing, means for attaching risers to said trapeze webbing, a harness fastening cross-link having two opposite ends and provided for fastening said harness onto a parachutist at the level of his chest, means for connecting said ends of said cross-link to said trapeze webbing, wherein said locking block serves both as one of said means for attaching one of said risers to said trapeze webbing and as said means for connecting one corresponding end of said cross-link to said trapeze webbing, said locking block comprising a support plate, a first means movable between a locked position and an unlocked position, a second means movable between a locked position and an unlocked position, and a single locking means for maintaining both said movable means in locked position, said first movable means including a lever pivotably supported by a pin onto the support plate, said level pivoting in a plane parallel to said support plate between a first, locked position and a second position, and a latch pivotably supported by a pin onto the support plate, said latch being positioned relative to said lever to hold said level in the locked position or to release said lever, said support plate being formed with two flanges perpendicular to the plane of said support plate, a bore being formed in each flange, the second movable means being a bracket of a general polygonal tubular configuration having opposite side portions and suitably sized to be inserted between said flanges of said support plate, said side portions of said bracket being formed with bores which come in alignment with said bores of said flanges when said bracket is installed in position between said flanges of said support plate, whereby said bracket defines with said support plate a clearance into which said one end of said harness fastening cross-link can be retained, said latch further extending beyond its supporting pin to provide a heel, said single locking means being a rod insertable underneath said heel of said latch and into said bores formed in said flanges of said support plate and in said bracket to connect them together.

7. A locking block according to claim 6, wherein said bracket includes an attaching rod and a cut portion for attaching a chest parachute and extra loads.

8. A locking block according to claim 6, wherein said rod has a tappered end.

9. A locking block according to claim 6, wherein said locking rod is held in place by a locking pin introduced in a bore formed into said rod.

10. A locking block according to claim 6, wherein said bracket includes a spring element cooperating with said rod in the locked position to provide a slight resistance to rod withdrawal.

11. A locking block according to claim 6, also including a central opening between said support plate flanges for supporting said bracket and an opening formed below the level to be reached by the lower edge of the bracket when said bracket will be installed in place on the support plate and will be in the locked position, said opening communicating with said central opening through a passage.

12. A locking block for a parachute harness comprising a trapeze webbing, means for attaching risers to said trapeze webbing, a harness fastening cross-link having two opposite ends and provided for fastening said harness onto a parachutist at the level of his chest, means for connecting said ends of said cross-link to said trapeze webbing, further including a means for positioning the attaching point of each said riser onto said trapeze webbing at the level of corresponding said means for connecting said ends of said cross-link to said trapeze webbing, said positioning means including a locating means at the upper portion of one of said harness webbing, one linking means placed at the lower portion of the corresponding riser and a strap element sliding in said linking means, said strap element being attached at one end to said locating means positioned at the upper end of said harness webbing and at the other end to said means for connecting said harness fastening cross-link, said strap element acting also as an element of said trapeze webbing for attaching said cross-link connecting means to said upper portion of said harness webbing, said locking block ensuring a successive release of at least one of said riser attaching means and of the corresponding said cross-link connecting means, said locking block including a support plate, a first means movably supported onto said support plate and movable between a locked position and an unlocked position, a second means movably supported onto said support plate and movable between a locked position and an unlocked position, a locking means for each of both movable means, a retaining means for holding one of said ends of said harness fastening cross-link in cooperation with at least one of said above mentioned means and a single locking member for said locking means, said first movable means being a pivoting level and the corresponding locking means being a latch pivotably supported onto said support plate, said second movable means comprising a rod pivotably supported onto said support plate and said second locking means being a rocker also pivotably supported onto said support plate, said retaining means for holding said end of said harness fastening cross-link onto said locking block including an ear integral with said support plate and relatively positioned to said rocker for holding said one end of said cross-link when said rocker is in locked position and for releasing said cross-link end when in the unlocked position.

13. A locking block according to claim 12, wherein said support plate is formed with a boss having a bore and wherein said single locking means is a rod which can be introduced into said bore in said support plate.

14. In a parachute harness for a man carrying parachute comprising a trapeze webbing, means for attaching risers to said trapeze webbing thereby connecting said trapeze webbing to shroud-lines of a main canopy, a harness fastening cross-link having two opposite ends and provided for fastening said harness onto a parachutist at the level of his chest, means for connecting said ends of said cross-link to said trapeze webbing, and a means for positioning the attaching point of each said riser onto said trapeze webbing at the level of the corresponding connecting means for connecting said cross-link to said trapeze webbing, a locking block includng a support plate, a means movably supported onto said support plate between a locked position and an unlocked position, a locking means for locking said movable means and a locking member for the locking means, said locking member further including a means for holding one of said ends of said harness fastening cross-link in the locked position of said locking block, said support plate being formed with a boss having a bore and wherein said locking member is a rod extending through the bore of said support plate and supporting a retaining means for one end of said harness fastening cross-link, said holding means for holding said one end of said harness cross-link being atop fixedly supported by said rod and cooperating with a fixed ear formed on the support plate for retaining said harness fastening cross-link end when said rod is in the locked position, and for releasing it when said rod is in its fully unlocked position, whereby said locking block ensures a successive release of said cross-link connecting means and of said riser attaching means.

15. A locking block according to claim 14, wherein said rod includes a first means allowing a partial displacement of said rod to release said locking member of said movable means while said end of the harness fastening cross-link remains locked, and a second means allowing a further displacement of said rod to release said end of said harness fastening cross-link.

16. A locking block according to claim 15 further including a safety catch pivotably supported onto said support plate between a first position, wherein it cooperates with a shoulder of said rod when same is in the locked position, and a second position, wherein it allows at least a partial displacement of said rod, wherein said first means allowing a partial displacement of said rod is a flat portion formed thereon for allowing a first displacement of said rod when said safety catch is in said second position and wherein said second means allowing a further displacement of said rod is a second flat portion formed on said rod at a different orientation and allowing a second displacement of said rod when said safety catch is moved back to said first position when said rod has been partially displaced.

17. A locking block according to claim 14, further including a safety catch pivotably supported onto said support plate between a first position, wherein it cooperates with a shoulder of said rod when same is in the locked position, and a second position, wherein it allows at least a partial displacement of said rod.

18. A locking block according to claim 17, wherein said safety catch includes a positioning pin cooperating with a cavity formed in said support plate and resiliently urged towards said support plate by a spring to provide a detent action.

* * * * *